UNITED STATES PATENT OFFICE.

EDWARD M. LANG, OF FALMOUTH, MAINE.

ELECTRODE FOR SECONDARY BATTERIES.

SPECIFICATION forming part of Letters Patent No. 398,409, dated February 26, 1889.

Application filed October 29, 1888. Serial No. 289,479. (No model.)

*To all whom it may concern:*

Be it known that I, EDWARD M. LANG, a citizen of the United States, residing at Falmouth, in the county of Cumberland and State of Maine, have invented certain new and useful Improvements in Electrodes for Accumulators or Storage-Batteries and the Method of Manufacturing the Same; and I do hereby declare that the following is a full, clear, and exact description of the invention, which will enable others skilled in the art to which it appertains to make and use the same.

The object of my invention is to provide a new and useful electrode for accumulators or batteries for the storage of electricity.

The electrode consists of tinsel-lead or fine threads or ribbons of lead compressed together into a plate of such form as is deemed most convenient. The method of manufacturing such electrode consists in casting or drawing the lead into fine threads or ribbons of great thinness. The tenacity of the threads is such that one hundred feet of them will weigh but one ounce. The threads or ribbons so produced are then collected together and pressed into plates either rectangular or oval, or of such form as may be best adapted for use.

The plates thus constructed, having been provided with the necessary conductors, are employed in the usual manner as plates or electrodes for accumulators or batteries for the storage of electricity. The plates thus formed are superior to all others, as the amount of surface presented is the largest amount possible to be secured within the space occupied by the plate.

I am aware that plates for accumulators have heretofore been made of lead in various forms, prepared by pouring the molten lead into water or powdered chalk or similar material or by blowing air through the melted lead, and I make no claim to plates thus formed.

What I claim as my invention is—

The electrode for accumulators or electric storage-batteries, consisting of fine threads of lead compressed into the desired form, substantially as described.

In testimony that I claim the foregoing as my invention I have hereunto set my hand this 27th day of October, A. D. 1888.

EDWARD M. LANG.

In presence of—
GEORGE E. BIRD,
ABNER H. DAVIS.